United States Patent Office 3,268,588 Patented August 23, 1966

3,268,588

PROCESS FOR PRODUCING HEXAMETHYLENEDIAMINE FROM 1-6-HEXANEDIOL

Theodore Horlenko and Hopkins W. Tatum, Corpus Christi, Tex., assignors to Celanese Corporation of America, New York, N.Y., a corporation of Delaware No Drawing. Filed Nov. 16, 1962, Ser. No. 238,293
3 Claims. (Cl. 260—585)

This is a continuation-in-part of application Serial No. 860,349, filed December 18, 1959, now abandoned.

This invention relates to a process of making amines. It more particularly refers to a process particularly adapted to making hexamethylenediamine. It is well known that hexamethylenediamine has outstanding utility as one of the starting reagents for making so-called 6–6 nylon.

This invention also includes the production of 6-aminohexanol-1, which is a useful intermediate for producing polyester amides, and has a boiling point at 12 mm. HgA of 125° C. and a freezing point of 57.3° C.; 1,6 hexanediol, 1,5 pentanediol and 1,4 butanediol, which have utility as intermediates in polyester formation and diamine production; hydroxy-caproic acid, which is an intermediate in the production of lactams and diols; caprolactone, which is a precursor of caprolactam; adipic acid, which is a nylon intermediary; N(6-hydroxyhexyl)hexamethylenimine, which has utility as a gas odorant and as a corrosion inhibitor, has a boiling point of 116° C. at 0.9 mm. HgA and an Index of Refraction $\{\eta_D^{26}\}$ of 1.4824; hexamethylenimine, which has utility in insecticides and herbicides; N(hexyl)hexamethylenimine and N(pentyl)hexamethylenimine which have utility as solvents for Grignard reactions and as oxidation inhibitors; and a polyamine having the formula $$H_2N[(CH_2)_6—NH]_XH$$

where X is 2 to 100, which polymer has utility as a precursor of the monomeric products set forth above.

This invention includes the production of hexamethylenediamine from cyclohexane by the following procedure: cyclohexane is oxidized; the oxidation product is esterified; the esters are hydrogenated to diols; and the diols are aminated to diamines. More particularly, the cyclohexane oxidation products includes cyclohexanone, cyclohexanol, adipic acid, glutaric acid, hydroxycaproic acid, caprolactone, formylvaleric acid, and succinic acid; the oxidation reaction includes the recycle to or retention in the oxidation reaction zone of cyclohexane, cyclohexanone and cyclohexanol while the adipic acid, hydroxycaproic acid and caprolactone are tapped off, suitably through a water extraction technique. The tapped off oxidation product may be esterified, preferably noncatayltically, although a catalyst can be used, if desired, with a suitable alcohol which is stable at esterification conditions. The esterification product ester or the oxidation product lactone is then catalytically hydrogenated to split the ester linkage giving the hydroxy compound corresponding to the esterified acid as well as the esterifying alcohol if there is one. The hydrogenation product is separated into its various components and at least the 1,6-hexanediol portion passed through an ammonolysis operation wherein ammonia and an ammonolysis catalyst are used to convert the 1,6-hexanediol or any other alcohol desired to its corresponding amine, such as hexamethylenediamine for example, which amine after suitable purification is a commercial product.

One aspect of the instant invention is the oxidation of cyclohexane and certain recycle oxidation intermediaries to produce the appropriate products. It is convenient to consider this operation as the oxidation of a mixture of cyclohexane, cyclohexanone and cyclohexanol since all of these compounds are jointly subjected to an oxidation reaction to produce the desired products. The reaction mixture of cyclohexane, cyclohexanone and cyclohexanol is suitably oxidized with air, oxygen, air enriched with oxygen or other suitable oxygen-containing gaseous mixture, preferably air for obvious economic reasons, at elevated temperatures and pressure above atmospheric.

Although it is not absolutely necessary, it is convenient to use an oxidation catalyst of any of the well known types generally employed in oxidation. Catalyst systems which work particularly well contain a metal which exists in at least two valence states, such as for example, cobalt, manganese, iron, chromium, nickel or copper. It is preferred to employ these metals in compound form, salts for example, although they can be used in the uncombined state. Cobalt naphthenate and cobalt acetate have been found to be particularly useful in the practice of the invention. Catalyst can be used having a proportion of metal to reaction mixture of 1 to 500 parts per million, preferably less than about 100 parts per million and optimumly less than 25 parts per million, e.g. 5 to 15 parts per million.

Since there is some tendency for some of the oxidation reaction products to polymerize, it is best to inhibit this propensity where possible. The polymerization of both hydroxycaproic acid and caprolactone can be inhibited by the addition of a minor amount of water to the reaction mass. This water can be suitably retained in the reaction mass by means of a reflux condenser which will return volatilized water to the reaction mass. This condenser also serves to retain volatilized constituents of the reaction mass, cyclohexane, cyclohexanone and cyclohexanol, in the reaction zone. It has been found that about 2 to 10 percent by weight of water in the reaction mass is convenient to inhibit polymerization of the reaction products.

The oxidation reaction temperature is suitably maintained between about 100 and 200° C. Temperatures below about 160° C. and preferably below about 140° C. have been found to be best for oxidation according to this invention. Oxidation reaction pressure is conveniently in the range of 50 to 700 p.s.i.g., preferably about 100 to 500 p.s.i.g., which pressure is suitably maintained by bubbling the oxidizing gas through a liquid reaction mass while permitting spent oxidizing gases to escape at such a rate as to maintain the desired pressure.

It is practical to pass the desired oxidation products, including hydroxycaproic acid, adipic acid, formylvaleric acid and caprolactone, directly into an esterification stage. It is also convenient to separate the oxidation product suitable for esterification from the recycle product. This can be accomplished by extracting the reaction products with water to form an aqueous phase containing the desired oxidation products to be esterified and a hydrocarbon phase containing the oxidation products and reactants to be recycled. The aqueous phase is then distilled to recover cyclohexanol and cyclohexanone for recycle or as salable products. While it is preferred to extract the oxidation product with water, it is within the scope of this invention to subject the oxidation products to distillation without first water extracting the hydroxycaproic acid, adipic acid and caprolactone therefrom. The ratio of water to reaction mixture in the extraction operation should be at least 1 to 4, preferably from about 1 to 4 to about 5 to 1. Extraction is conveniently carried out above room temperature, 30 to 150° C. being adequate and 50 to 100° C. being preferred.

The water extract is permitted to settle into an aqueous phase and a hydrocarbon phase, the hydrocarbon phase containing cyclohexanone, cyclohexanol and cyclohexane and the aqueous phase containing hydroxycaproic acid, adipic acid, cyclohexanone, cyclohexanol and caprolactone. The hydrocarbon phase is recycled to the oxidation reactor and the aqueous phase is distilled to remove any cyclohexanone and cyclohexanol as water azeotropes, which distillate may be returned to the oxidation reaction, leaving hydroxycaproic acid, adipic acid, caprolactone, and other acid and ester oxidation products to be esterified.

In the alternative, the above described water extraction operation can be forgone and the oxidation reaction products can be passed directly to a distillation step in which the water, cyclohexane, cyclohexanone and cyclohexanol are stripped off overhead, preferably azeotropically, and returned to the oxidation operation leaving behind an aqueous residue containing hydroxycaproic acid, caprolactone and other acid products. In this alternative procedure, it is desirable to add water to the distillation operation with the oxidation reaction products in order to have sufficient water present to azeotrope with the fraction to be recycled. Additionally, the excess water present in the distillation operation tends to inhibit the polymerization of $\epsilon$ hydroxycaproic acid and $\epsilon$ caprolactone and also inhibits esterification of the acid products such as adipic, glutaric or succinic acid by the cyclohexanol which is present. It is practical to use either atmospheric or reduced pressure at temperatures ranging from about 50 to 100° C. in the distillation discussed above.

Another alternative procedure for removing the cyclohexanone and cyclohexanol in the aqueous phase of the extracted oxidation product is by liquid-liquid extraction with cyclohexane at about 25 to 100° C., the cyclohexane extraction product is suitably removed, e.g. by distillation or other techniques.

Although it is possible to produce hydroxycaproic acid and caprolactone by batch oxidation of cyclohexane, cyclohexanol and cyclohexanone, it is much more desirable to operate continuously. It is convenient to use a "back-mixing" type of reactor wherein there is thorough agitation of the reaction mixture while an oxidizing gas is being bubbled through the reaction mixture and wherein cyclohexane is being continuously fed into the reactor, reaction product is continuously being tapped off and cyclohexanone, cyclohexanol and cyclohexane are continuously being recycled to the reactor.

The composition of the reaction mass will of course depend upon the temperature and pressure at which the reaction is carried out as well as upon other reaction variables. It has been determined that the reactor feed including recycle should be about $\frac{1}{30}$ to $\frac{1}{10}$ part cyclohexanol, about $\frac{1}{3}$ to $\frac{2}{3}$ part cyclohexanone and about 1 part cyclohexane. A suitable reaction mass contains about 45 to 60 weight percent cyclohexane, about 3 to 5 weight percent cyclohexanol, about 25 to 35 weight percent cyclohexanone, about 4 to 8 weight percent hydroxycaproic acid and caprolactone, about 1 to 4 weight percent adipic acid and other oxidation product acids, and about 2 to 10 weight percent water.

An oxidation reaction with continuous operation under recycle conditions specified above will come to equilibrium in time. The equilibrium reaction mass proportions will vary depending upon the reaction conditions. For example, at a reaction temperature of 125° C. using a cobalt catalyst, the equilibrium proportions of reactor feed will be about 65 parts by weight cyclohexane, about 28 parts by weight of cyclohexanone, about 5 parts cyclohexanol and about 2 parts of other material, e.g. caproic acid and caprolactone. For best results the degree of conversion of cyclohexane to desired products should be about 10% or less, preferably about 5 to 10%. The reaction time, average residence time of the reaction mixture at the reaction temperature, should be about 10 minutes to 4 hours, preferably 25 to 50 minutes. Other oxidation reaction catalysts includes chromium, manganese and combinations thereof. Table I below is a compilation of data showing the equilibrium oxidation reactor feed compositions.

TABLE I.—COMPOSITION

| Catalyst | Chromium | Manganese | None |
|---|---|---|---|
| Component: | | | |
| Cyclohexane | 80 | 80 | 80 |
| Cyclohexanone | 12 | 9 | 7 |
| Cyclohexanol | 4 | 7 | 7 |
| Others, e.g. Caproic Acid and Caprolactone | 4 | 4 | 6 |

The recovered oxidation products are commercial products which can be sold on the market if desired. It is preferred however, to esterify the products of the oxidation reaction described above.

The esterification of the oxidation product (e.g. hydroxycaproic acid, caprolactone, adipic acid, glutaric acid and succinic acid can be carried out catalytically or non-catalytically. In the instant invention, it is preferred to esterify non-catalytically. The esterification is suitably carried out with substantially any monohydric or polyhydric hydroxyl containing compound which is thermally stable at temperatures in excess of 150° C. The hydroxyl containing compound must have a boiling point high enough to be non-volatile during the non-catalytic esterification reaction. Hydroxyl containing compounds which are useful in this invention are exemplified by n-decyl alcohol, propylene glycol, 1,6 hexanediol, 1,4 butanediol, 1,5 pentanediol, ethanol, methanol, and n-butanol, the latter three alcohols being esterified under pressure.

It is convenient to carry out the esterification operation in one or more distillation columns. In one embodiment of this invention, the acid products of oxidation referred to above are mixed with an esterifying alcohol, glycol or polyol and introduced into a distillation column which operates at about atmospheric pressure until a pot temperature of about 160 to 200° C. is realized whereupon the temperature is maintained by reducing the pressure to about 100 mm. HgA and then the temperature is permitted to climb to about 250° C. The product is taken as a liquid stream from the base of the column and the water and other volatiles are taken overhead. Part of the base product is refluxed and part introduced into a second column where further esterification takes place. The product of the second column is taken as a base stream, part refluxed and part passed to a third column where the ester product and any unreacted esterification alcohol or polyol are separated from any water present. The water is taken overhead, part refluxed to the column and part taken out of the process to be sewered or used elsewhere. The ester product and unreacted esterification alcohol are taken as a base stream and sent to a column in which the unreacted alcohol or polyol is separated from the esterification product.

In another embodiment of this invention, esterifying alcohol or polyol can be added directly to the products of oxidation before the acid products are separated from the recycle cyclohexanone, cyclohexanol and cyclohexane. The oxidation product—alcohol mixture is flashed to remove water, cyclohexane, cyclohexanol and cyclohexanone; and the hydroxycaproic acid, caprolactone, adipic acid, glutaric acid and succinic acid are esterified, both in a single operation. The esterification products are taken as a base stream while the recycle products are taken overhead. The base stream is fed into a distillation column where further esterification takes place, the fully esterified product together with any excess esterification alcohol being taken as a base stream, and the low boilers, water and unreacted materials being taken overhead. The two overhead streams are combined and passed through a separation unit which may suitably comprise a decanter and/or an extractor. The water is removed from the overhead stream and the organic phase is recycled. The excess alcohol in admixture with the ester product may be sepaarted, e.g. by distillation or extraction, and recycled if desired.

In a modification of this latter embodiment, it is practical to eliminate the flashing step set forth above and carry out both the esterification and removal of recycle constituents in one column. The esterification product is taken as a base stream and the water and recycle constituents are taken overhead.

Where 1,6 hexanediol is the esterifying alcohol, noncatalytic esterification takes place at about 100 mm. HgA to atmospheric pressure, at a temperature of about 150 to 250° C., and a mole ratio of about 0.5 to 1 to 10 to 1 alcohol to acid. It is preferred to operate at about 200° C. at an alcohol to acid ratio of about 3 to 1. In the first embodiment set forth above wherein a two column series esterification is utilized in combination with a third column separation unit, the final 80% of the esterification takes place in these first two columns, the combined residence times in these columns being about 2 hours, conversions as high as 95%, based upon acids fed, have been realized in the esterification operation. In this embodiment, the third esterification column operates at a reflux ratio of 2 to 1 and the water overhead is taken at 100 mm. Hg absolute. The column used to separate unreacted alcohol from ester product is conveniently operated at a 1 to 1 reflux ratio at about 10 mm. Hg absolute. The product of esterification generally contains about 60% ester, 35% alcohol, 0.8% acid and 0.2% water. The ester has a high viscosity and an amber color.

The ester product, free from as many contaminants as possible, made according to any method, but preferably by the last of the embodiments set forth above wherein flashing and esterification are carried out concurrently, is hydrogenated to break the ester bond thereby regenerating the esterifying hydroxyl compound and hydrogenating the carboxyl moieties to their corresponding alcohols, e.g. 1,6 hexanediol, 1,5 pentanediol, 1,4 butanediol, n-hexanol and cyclohexanol. The hydrogenation can be advantageously carired out by feeding the esterification product and hydrogen to a reactor maintained at about 200 to 350° C. and 1000 to 12,000 p.s.i.g., preferably 250 to 290° C. and 3700 to 5000 p.s.i.g. The reactor contains a hydrogenation catalyst. Substantially any of the known hydrogenation catalysts are operable, however, copper chromite, barium stabilized copper chromite, Raney copper and barium oxide promoted copper chromite have been found to be particularly well suited to this process since they are not poisoned to any great extent during the process. Suitably, the catalyst may be supported by an inert carrier, e.g. pumice or inactive alumina. Inactive alumina is alumina hydrate which has been calcined at between about 1000° C. and the melting point of alumina. In investigating the parameters of this invention, it was found that barium oxide stabilized copper chromite catalyzed the hydrogenation to 80% or higher conversions. It is practical to carry out the hydrogenation either with or without a solvent. Where a solvent is used, dioxane has been found to work well as have butanol and ethanol. The solvent is admixed with the esters at about 100 to 150° C.; the mixture then heated to about 190° C. in a closed vessel; and then fed into the hydrogenation reactor. The proportion of solvent to ester in the feed is about 1 to 4 to 2 to 1, preferably about 1 to 1.

The hydrogenation reaction can be carried out in either a fixed, flooded catalyst bed, a slurry catalyst bed or a trickle catalyst bed. In any case, the heat of reaction brings the reaction mass up to a temperature of about 245 to 250° C. and the feed hydrogen supplies the pressure necessary for hydrogenation. A fixed, flooded catalyst bed is one in which the particles of catalyst are substantially pelletized or in some other relatively large form wherein the liquid phase material being acted on by the catalyst is a continuous phase which completely submerges the catalyst bed. A fixed trickle catalyst bed is one in which the particles of catalyst are generally pelletized and placed in a relatively fixed position with the liquid phase material being acted on by the catalyst being fed at the top of the bed and forming a relatively discontinuous phase. A slurry bed catalyst consists of powdered catalyst, e.g. about 60 microns or less, with the liquid phase being acted upon flooding the catalyst bed and floating the powdered catalyst. In the slurry bed catalyst it is usual to introduce the liquid at the bottom of the bed; in the trickle bed catalyst, it is usual to introduce the liquid at the top of the catalyst bed; and in the flooded fixed bed catalyst the liquid can conveniently be fed at top or bottom although the bottom is preferred. In each case, the gas phase is introduced at the bottom of the catalyst bed and bubbled through a slurry or fixed flooded bed catalyst, or forms a continuous phase through which liquid trickles. In bubbling gas through liquid, it is best to keep the gas bubbles small in order to maximize the ratio of surface area to volume of each bubble.

It is preferred that the hydrogenation catalyst life is such as to produce at least about 100 pounds of alcohol hydrogenation product per pound of catalyst. A catalyst life such that 200 pounds of diol product per pound of catalyst is made would of course be greatly desirable. These production rates are readily accomplished through the use of this invention.

The hydrogenation product is taken as a base stream from the reactor and passed through a purification operation to separate the various products. Before the hydrogenation product is passed to the purification operation, it is let down in pressure to about 125 p.s.i.g. to atmospheric pressure in order to permit dissolved hydrogen to escape, which hydrogen may be recycled. The hydrogenation reactor is vented overhead thereby maintaining the required pressure with the hydrogen thus passed off either being permitted to escape to the atmosphere, recycled into the hydrogen feed or used elsewhere.

Where a solvent is used, the hydrogenation product is distilled to remove the solvent overhead with the alcohol products being taken as a base stream. In either case, where solvent is used and distilled off or where no solvent is used, the hydrogenation product alcohols substantially free of solvent are subjected to successive distillations to separate the products. The first column is preferably operated at about 20 to 10 mm. Hg absolute and about 160 to 200° C. to remove the substantially pure mixture of alcohols from undesirable high boilers. The mixed alcohols are taken overhead and passed into a second column which operates at about 20 mm. Hg absolute with a pot temperature of about 200° C. and a vapor temperature of about 145 to 146° C. to remove the 1,5 pentanediol and 1,4 butanediol overhead. The base stream from this column is passed into a third distillation column operating at about 155 to 170° C. and 20 to 44 mm. Hg absolute to purify the 1,6-hexanediol which is taken overhead and surged to heated vessels and thence part recycled to the esterificaiton operation referred to above and part fed into an ammonolysis operation. The base stream from the third still can be sewered or separated and purified to recover any valuable products therefrom.

It is within the scope of this invention, in the alternative, to operate the second distillation column such that some of the 1,5 pentanediol is taken overhead with the other lower glycols and some of the 1,5 pentanediol is taken as a base stream in admixture with 1,6 hexanediol. The base stream is then fed into the third distillation column operated at such conditions that 1,5 pentanediol is taken overhead and 1,6 hexanediol is taken as a vapor side stream just below the feed point.

The hydrogenation product, 1,6 hexanediol, is aminated by mixing the diol with ammonia and passing it over an ammonolysis catalyst at about 1500 to 4000 p.s.i.g. and 150 to 250° C., preferably 2800 to 3300 p.s.i.g. and 180 to 220° C. The ammonolysis product is purified to produce hexamethylenediamine product while most of the other ammonolysis products are recycled. Ammonolysis of 1,6 hexanediol can be carried out with ammonia alone or preferably with ammonia mixed with hydrogen. It is preferred, where hydrogen is used, to utilize the hydrogen vented from the hydrogenation reactor since the hydrogenation is carried out at a higher pressure than the ammonolysis and hence the vent hydrogen is suited to direct use in the ammonolysis reactor. It is also preferred to add, as recycle streams, substantially all the 6 carbon precursors of hexamethylenediamine which are formed in the ammonolysis reactions and later separated from the hexamethylenediamine product. It is of course within the spirit and scope of this invention to either recycle these compounds, recover them for sale, or otherwise dispose of them.

It has been determined that suitable ammonolysis catalysts are Raney cobalt, Raney nickel, reduced copper, Raney copper and nickel on keiselguhr, preferably pelletized Raney nickel. The reaction between the ammonia, diol and any recycled diamine precursors takes place over the catalyst bed. It is further preferred to include hydrogen, suitably from the hydrogenation operation vent, with the ammonia in the ammonolysis reactor. Mole ratios of ammonia to hydrogen in the range of about 4 to 1 to 30 to 1 have been found to be operable with about 6 to 1 to 10 to 1 being preferred. The optimum ratio of ammonia to hydrogen for conversion of 1,6 hexanediol to hexamethylenediamine at 3300 p.s.i.g. and 500° F. is about 8 to 1. The ratios of ammonia molecules to carbon atoms in the ammonolysis is about ⅓ to 5 to 1.

The ammonolysis reaction can be carried out in a fixed or a slurry bed catalyst system. A fixed bed catalyst can be in the form of a trickle bed or a flooded bed, preferably the latter.

The ammonolysis reaction product is suitably reduced in pressure to about atmospheric to 150 p.s.i.g., preferably about 133 p.s.i.g., to remove most of the entrained or dissolved ammonia and hydrogen which is recycled to the ammonia feed. The remaining liquid is then distilled at about 100 p.s.i.g. to remove the remaining ammonia. The product, substantially ammonia free, (the product may contain up to about 8% ammonia) is dried by being azeotroped, suitably with cyclohexane at about atmospheric pressure, pot temperature of about 80 to 130° C. and vapor temperature of about 60 to 70° C. The dry product is taken as a base stream and distilled at a pot temperature of about 140 to 170° C., a vapor temperature of about 70 to 95° C. and 100 to 200 mm. Hg absolute to remove hexamethylenimine overhead which is either recycled to the ammonolysis reactor or taken as a product. The base stream is distilled at a vapor temperature of 195° F., a pot temperature of 275° F. and 10 mm. Hg absolute to recover hexamethylenediamine overhead at about 90% yield. The base stream is either recycled to the ammonolysis reactor or separated apart into salable products.

The ammonolysis reaction and product recovery system described above is about 90 to 95% efficient with about 10 to 15 weight percent of the diol feed going to diamine product. The yield of the ammonolysis in terms of hexamethylenediamine recovered per hexanediol consumed is about 90%. Under steady state equilibrium conditions, using a slurry bed catalyst the recycle composition in the ammonolysis operation is about 10 weight percent hexamethylenimine, 1 weight percent hexamethylenediamine, 52 weight percent 1,6 hexanediol, 35 weight percent 6 amino hexanol-1; and the remainder polyamines, 1-(6-aminohexyl)hexamethylenimine, cyclohexylamine, 1,6 diimino hexane and other similar products. With a fixed bed of Raney nickel pellets the recycle distribution was 23% 1,6 hexanediol, 12% hexamethylenimine, 12% 1-amino-6-hexanol, 34% 1-(6-aminohexyl) hexamethylenimine, 0.3% hexamethylenediamine, and 18.7% of other products. Amylamine comes off with the cyclohexane fraction. Dimethyl amine is found in the ammonolysis reactor vent gas.

Another aspect of this invention is the discovery that Raney nickel pellets catalytically promote the reaction of hexamethylenediamine to hexamethylenimine. The yield in this reaction is about 50%.

It has been found that the process described above for the manufacture of hexamethylenediamine or similar products can be enhanced by improving the life of the hydrogenation catalyst. One method of improving hydrogenation catalyst life is to use oxidation and esterification equipment, as well as all transfer and purification equipment associated therewith, which is constructed of material which will not be detrimental to hydrogenation catalyst life. In order to carry out this improvement, it is preferred to utilize glass, polyethylene, fluorinated polyethylene, type 316 stainless steel or the like as the construction material for such equipment.

Alternatively, it has been found that the cyclohexane oxidation product can be passed through a cation exchange resin bed to remove substantially all metal ions therefrom at some point prior to hydrogenation, e.g. before or after esterification. The particular point of ion exchange is only relevant to removal of metal ions and any particular point where this can be expediently accomplished is suited to use in this invention. Cation exchange resins which are useful in this invention include sulfonated styrene-divinyl benzene copolymers and sulfonated resins, e.g. Dowex-50 and Rohm and Haas IR–120. Throughput of cyclohexane oxidation product is conveniently 200 to 400 pounds per hour per square foot of cation exchange resin cross section. The resin bed may be regenerated by passing a strong acid therethrough, such as sulfuric acid for example, and flushing with water.

The following specific example is given to further illustrate the practice of this invention but is not to be construed as limiting this invention.

*Example*

All proportions are in parts by weight or weight percent unless specified to the contrary. Cyclohexane was fed at a rate of 437 parts per hour and mixed with a recycle stream of 3743 parts per hour cyclohexane, 569 parts per hour of cyclohexanone, 237 parts per hour of cyclohexanol, 24 parts per hour of adipic acid and 71 parts per hour of hydroxycaproic acid. The fresh feed-recycle stream was fed to an oxidation reactor operating at 145 to 160° C. at 500 p.s.i.g. and mixed therein with 3144 parts per hour of air and 0.026 parts per hour of cobalt naphthenate. Reactor product was withdrawn at a rate of 5510 parts per hour, mixed with 2563 parts per hour of water and fed to a flasher. The overhead stream from the flasher was 2828 parts per hour of cyclohexane, 155 parts per hour of cyclohexanone, 51 parts per hour of cyclohexanol, 48 parts per hour of adipic acid, and 146 parts per hour of hydroxycaproic acid. The base stream from the flasher was 3712 parts per hour and was fed to a stripper column wherein 246 parts of adipic acid, 298 parts per hour of hydroxycaproic acid, 42 parts per hour of glutaric acid, and 998 parts per hour of water was taken as a base stream. The stripper overhead was combined with the flasher overhead and decanted to provide the recycle feed and part of the water referred to above.

The reactor product stream was fed to a water stripper where 900 parts per hour of water was removed overhead. The water stripper base stream was mixed with 791 parts per hour of 1,6 hexanediol and fed to an esterification column where 194 parts per hour of water and 125 parts per hour of 1,6 hexanediol were taken overhead. The esterification column base stream, containing 32 parts per hour of adipic acid, 39 parts per hour of hydroxycaproic acid, 467 parts per hour of 1,6 hexanediol, and 596 parts per hour of ester, was fed to an ester finishing column wherein 212 parts per hour of water was taken overhead and the product was a base stream containing 666 parts per hour of ester, 225 parts per hour of 1,6 hexanediol and 16 parts per hour of hydroxycaproic acid.

The esterification product was admixed with 75 parts per hour of barium oxide promoted copper chromite and 74 parts per hour of hydrogen and fed to a hydrogenation reactor operating at 260 to 275° C. at 4000 to 4800 p.s.i.g. The residence time in the hydrogenation reactor was 3 hours. The hydrogenation product was 74% 1,6 hexanediol which product was washed with dioxane and filtered to remove catalyst and hydrogen and then distilled to obtain 1,5 pentanediol, 1,6 hexanediol and light ends overhead. The 1,5 pentanediol was recovered as was the 1,6 hexanediol which latter diol was split to provide feed for esterification and feed for ammonolysis. Of the recovered 1,6 hexanediol, 384 parts was subjected to ammonolysis.

The 1,6 hexanediol was mixed with 105 parts of ammonia and 1 part of hydrogen as well as a recycle stream containing 97 parts of hydrogen, 354 parts of 1,6 hexanediol, 4786 parts of ammonia, 303 parts of hexamethylenimine, 286 parts of 6 amino hexanol, 774 parts of 6 (-amino-hexyl) hexamethylenimine and 774 parts of poly(hexamethylenediamine). The reactor was maintained at 210° C. and 3300 p.s.i.g. and the residence time was 1 hour. The reactor product was flashed to remove hydrogen and ammonia overhead and the residue from the flasher was stripped to remove additional ammonia overhead which stream when purified was fed into the recycle stream. The stripper raffinate (residue) was mixed with cyclohexane and fed to a drying column where the water was taken off as a cyclohexane azeotrope. The azeotrope was decanted to remove water and the cyclohexane recycled to admixture with the ammonia stripper raffinate. The drying column residue was fed into an imine column where hexamethylenimine was taken overhead. The imine column residue was fed to a diamine column where 336 parts of hexamethylenediamine was taken as a side stream while the residue, containing 1,6 hexanediol, 6 amino hexanol, 6-(amino hexyl) hexamethylenimine and poly(hexamethylenediamine), was recycled back to the ammonolysis reactor.

In prior art processes, wherein cyclohexane has been oxidized to produce valuable materials, the adipic acid oxidation product has always been separated from other acids and acid derivatives, e.g. lactone, produced by the oxidation, before further processing. One of the attributes of the present invention is the surprising fact that cyclohexane oxidation product acids and acid derivatives including unseparated adipic acid can be esterified in a single procedure to produce esters which can be hydrogenated in a single procedure to produce high yields of one product, 1,6 hexanediol.

It is to be understood that the foregoing detailed description is given merely by way of illustration and that many variations may be made therein without departing from the spirit of our invention.

Having described our invention what we desire to secure by Letters Patent is:

1. Continuous process for producing hexamethylenediamine which comprises continuously introducing 1,6-hexanediol, ammonia and hydrogen into a reaction zone containing a catalyst selected from the group consisting of Raney nickel, Raney cobalt and nickel on kieselguhr in the following ratios: mole ratio of ammonia to hydrogen of about 4 to 1 to 30 to 1 and ratio of ammonia molecules to carbon atoms of about ⅓ to 1 to 5 to 1; maintaining said reaction zone at about 180 to 220° C. at about 1500 to 4000 p.s.i.g.; producing by reaction of the contents of said reaction zone under the conditions expressed above at least hexamethylenediamine; removing and recycling hexamethylenimine from said hexamethylenediamine product; recovering hexamethylenediamine as an overhead stream; and recycling the base stream product to the ammonolysis reactor.

2. Process claimed in claim 1 wherein said catalyst is Raney nickel pellets.

3. Process claimed in claim 2 wherein said reaction zone is maintained at about 2800 to 3300 p.s.i.g. and the ratio of ammonia to hydrogen is about 8 to 1.

References Cited by the Examiner

UNITED STATES PATENTS

| | | | |
|---|---|---|---|
| 2,208,935 | 7/1940 | Neal et al. | 260—349 |
| 2,318,730 | 5/1943 | Wilson | 260—583 |
| 2,364,178 | 12/1944 | Wilson | 260—583 |
| 2,390,766 | 12/1945 | Zellhoefer et al. | 260—583 |
| 2,412,209 | 12/1946 | Dickey et al. | 260—585 X |
| 2,612,500 | 9/1952 | Raasch | 260—239 |
| 2,617,835 | 11/1952 | Curtin | 260—635 |
| 2,618,658 | 11/1952 | Caldwell | 260—584 |
| 2,657,239 | 10/1953 | Rigby | 260—583 |
| 2,754,330 | 7/1956 | Schreyer | 260—239 |
| 2,786,834 | 3/1957 | Rice et al. | 260—239 |
| 2,800,504 | 7/1957 | Elce et al. | 260—533 |
| 2,830,084 | 4/1958 | Clingman | 260—533 |
| 2,941,994 | 6/1960 | Silberman | 260—239 |
| 3,031,505 | 4/1962 | Pollitzer | 260—584 |
| 3,081,357 | 3/1963 | Alderson et al. | 260—635 |

CHARLES B. PARKER, *Primary Examiner.*

NICHOLAS RIZZO, *Examiner.*

ALTON D. ROLLINS, ANTON SUTTO, *Assistant Examiners.*